(No Model.)

J. B. EDMISTON.
FILTERING OR PURIFYING FEED WATER.

No. 481,109. Patented Aug. 16, 1892.

Witnesses
Geo. E. Cruse
J. Cotton

Inventor
James Brown Edmiston
By Knight & Bro
Attorneys

UNITED STATES PATENT OFFICE.

JAMES B. EDMISTON, OF LIVERPOOL, ENGLAND.

FILTERING OR PURIFYING FEED-WATER.

SPECIFICATION forming part of Letters Patent No. 481,109, dated August 16, 1892.

Application filed May 20, 1891. Serial No. 393,455. (No model.)

*To all whom it may concern:*

Be it known that I, JAMES BROWN EDMISTON, engineer, a subject of the Queen of Great Britain, residing at Liverpool, in the county of Lancaster, in the Kingdom of England, have invented certain new and useful Improvements in Filtering or Purifying Feed-Water, of which the following is a specification.

My invention consists in the features of novel construction hereinafter described and claimed.

Figure 1:
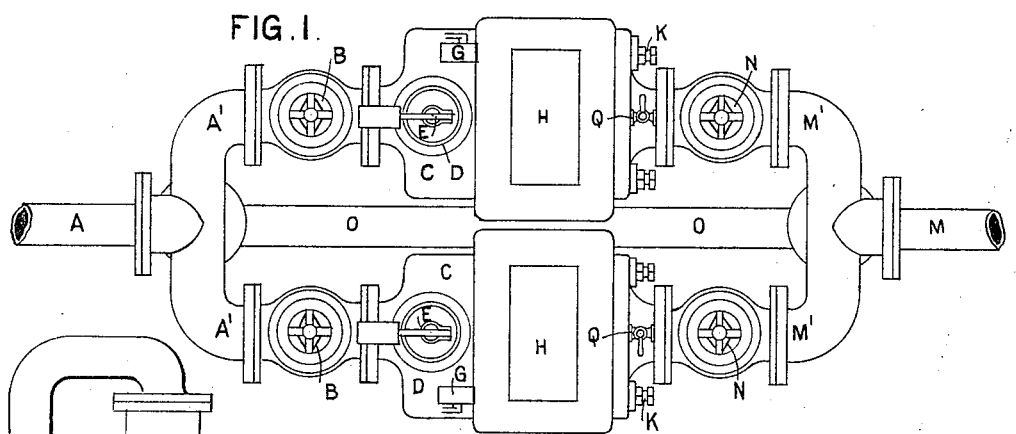
Figure 2:
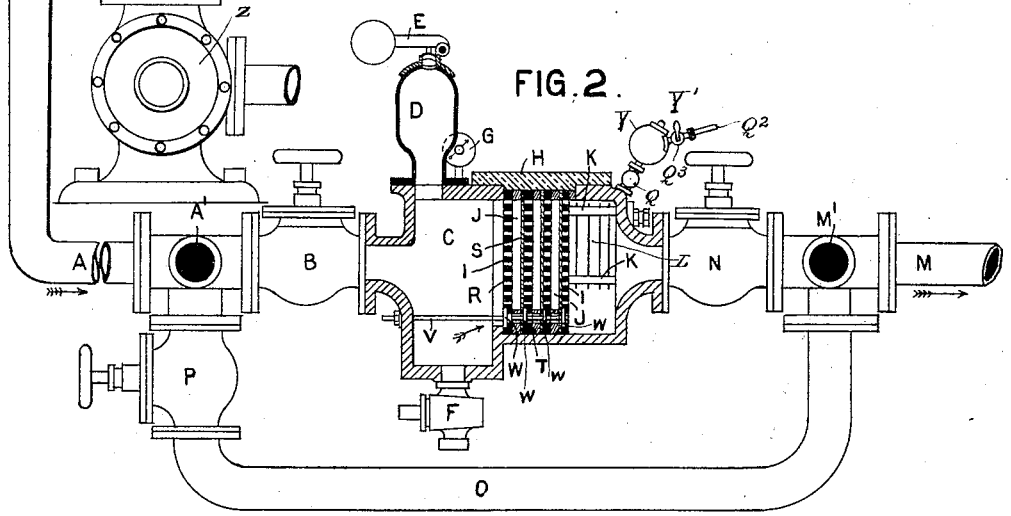
Figure 3:
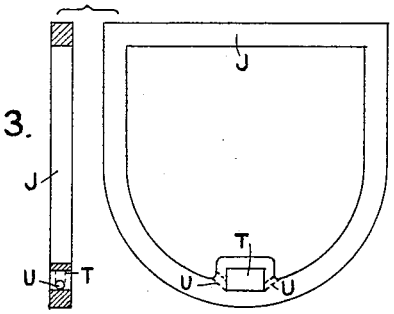
Figure 4:
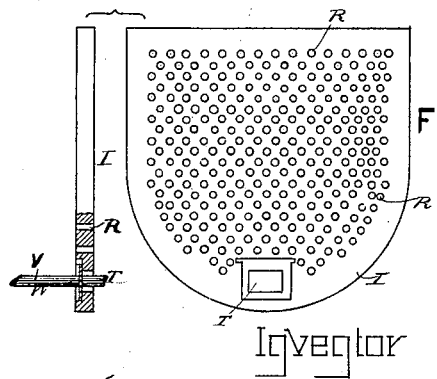

Referring to the drawings, Figure 1 is a plan; Fig. 2, an elevation, partly in section, of my apparatus; Figs. 3 and 4, enlarged views of plates.

A is a feed-pipe leading from the feed-pump Z or other source of supply and branching off into two or more branches A', each supplied with stop-cock B.

C is a strong box or chamber of any convenient shape, preferably as nearly cylindrical as practicable; D, air-vessel; E, safety-valve; F, blow-off valve; G, pressure-gage; H lid or cover of box C; I, a series of plates shown in detail in Fig. 4 and more fully described hereinafter; J, spacing-frames of metal or other material placed between plates I I and formed as an open network or skeleton, as seen in detail in Fig. 3, so as to allow the free passage of liquor through them opposite and near all perforations in plates I I; K, set-screws holding the plates and frames in place; L, cage or series of open zinc plates hanging from screws K and allowing free passage of the water among them; M', exit-pipe; N, stop-cocks similar to B B; M, final exit-pipe to boiler, into which pipes M' and M' converge; O, pipe through which the water can pass instead of through the filters in case at any time both valves B had to be shut down; P, cock governing this pipe in the same manner that cocks B or N govern their respective filtering apparatus; Q Q, nozzles with stop-cocks, by which steam can be admitted to either of the filters.

Referring now to Figs. 3 and 4, J are the spacing-frames, (shown on an enlarged scale in Fig. 3,) and I the plates. These are preferably of hard wood—such as teak—and are perforated with numerous holes R, except where opposite the skeleton frames J. S S are two stout cloths, preferably flannel in two thicknesses. Each of these is nailed, screwed, or otherwise clamped to the plates I. T is a passage formed entirely through both the plates I and the frames J. This can be right on the floor of the box or a little above it, as shown. The passage T in each plate is closed by plugs or valves W, which are mounted on and worked by a screw-rod V, extending from the outside. Orifices U (shown in dots, Fig. 3) pass down through the frames to this passage to deliver the dirt.

The mode of action of this apparatus is as follows: One of the valves B being opened and the valve P being closed, the feed-water from A passes to whichever of the chests C is open to it. The valves W being closed against the force of the water, the water has to pass through the various flannel sheets S S until it arrives opposite the cage L. In the course of its passage it has been filtered from all but the very finest solid material. At L it comes into contact with the zinc plates, which are in electrical contact with the iron or brass screws K. The result is that a galvanic action is set up and any acids present in the water that comes in contact with the zinc plates combine with or decompose the latter, forming a neutral zinc salt not injurious to the boiler. The water then passes on from a valve N and pipe M' to the delivery-pipe M. After a time the cloth filter will get somewhat clogged with dirt, and this clogging will increase until the water will have a difficulty in passing through. The pressure-gage G will then rise, give the indication, and if this indication be not observed the safety-valve E will open, allowing water to escape. Any ordinary alarm attachment can be connected with the safety-valve, so that should this open an alarm will be given. The engineer, finding that the filter is clogged, immediately opens the other valve B and closes the one connected with the spent filter. The filtering water now passes through the other filter.

In order to clean a spent filter, the engineer shuts down the valve N, connected with it, and by means of the cock Q passes steam into the filter in the opposite direction to that in which the water flows. While the filter had been in action the pulsations of the pump D had kept the flannel of the filter in a constant state of tremor, thus causing the dirt settling on the flannel to a considerable extent to fall down and enter the passage T, which, however, was closed up to now by the valves W. When, however, the steam is let in through the cock Q and the valves W are opened, all this dirt is forced out at once and escapes through the cock F. If now the valves W be closed by the screw V, the steam is forced to pass through the flannels, thus driving out most of the dirt which was lodged in them. Again, the valves W being opened, this dirt is driven out, as before. If now the cock F be closed, the whole chamber C fills with steam, or the bulk of it, and the little remaining contents of the filter are well boiled. On again opening the valves W and the cock F nearly all the remaining dirt in the chamber is removed. The steam is then cut off and the cock F being shut the apparatus is ready to be turned on when the companion filter is fouled. If by any chance both filters, or as many filters as there are, are all fouled or out of order at the same time, valve P is opened and the feed-water enters the boiler without filtering through the pipe O, just as if there had been no filters at all. When the filters are found to be extremely dirty or defective and cannot be sufficiently cleaned by the aid of steam, a cover H is removed, the various plates I and the frames J are taken out, and the filter-cloths attended to in any desirable manner. The filter may sometimes be placed on the suction side of the feed pump or pumps, and work solely by the suction of said pump or pumps. In this case the air-vessel D and safety-valve E are unnecessary, and the pressure-gage G is replaced by a vacuum-gage located at any convenient point between the pump and the filtering-diaphragms, but preferably on the delivery end of chamber C. When working with a suction, however, or with only slight pressure, I prefer to form the filtering layer of sponge, wool, or other very porous material.

It may sometimes be found desirable to provide means whereby soda or other alkali or chemical may be introduced into the feed-water, preferably into the filter on the delivery side thereof, for the purpose of forming neutral salts with some of the impurities in the water. Y, Fig. 2, is a cup somewhat similar to an ordinary tallow-cup, into which such soda or other chemical may be introduced through a cap Y'. The cup Y may be connected with the upper end of the steam-cock Q, aforesaid, as shown, so that the chemicals can be discharged into the filter and so be passed into the boiler with the water. The cup may be provided near its upper end with a connection to a steam-pipe $Q^2$, which latter is also provided with a cock $Q^3$.

In cleaning the filter the steam is blown through both the cup Y and the cock Q in a similar manner to that already described. The cup may also be used for introducing detergents into the filter when blowing through, as above described.

I declare that what I claim is—

1. The combination, with a filtering-chamber and a pump passing liquid through the chamber, of a series of flexible filtering-diaphragms placed across the water-way in said chamber at suitable distances apart and supported in such manner as to be free to pulsate with the strokes of the said pump, which passes the liquid successively through them, and means whereby the impurities may be discharged from the spaces between the diaphragms from time to time, as required, substantially as described.

2. The combination of the filtering-chamber C, the filter-cloths S, placed across the chamber between the inlet and outlet thereof, perforated partitions I, supporting the cloths, frames J, alternating with the partitions I, steam-cock Q on the outlet end of the chamber, blow-off cock F on the inlet end thereof, passage T, running through the entire series of partitions and frames and communicating with the latter, and the valve or valves W, controlling said passage, substantially as and for the purpose described.

3. The combination of the filtering-chamber C, perforated partitions I, supporting filter-cloths S within said chamber, as described, frames J, alternating with said partitions, passage T, running through the entire series of partitions and frames, passages U, leading from passage T to the interior of the frames, valve or valves W, controlling the passage T, and a device for regulating the valve from the exterior of the chamber, substantially as described.

4. The combination of the chamber C, filtering-diaphragms S, placed across the water-way through the chamber, cock Q on the discharge end of said chamber, cup Y, opening into cock Q, steam-cock $Q^3$, leading to cup Y, and blow-off cock F on the supply end of the chamber, substantially as and for the purpose described.

In testimony whereof I have signed my name to this specification in the presence of two subscribing witnesses.

J. B. EDMISTON.

Witnesses:
 GEO. C. DYMOND,
 H. P. SHORBRIGE.